Oct. 10, 1950
J. L. BETTS
2,524,753
METHOD OF RECOVERING HEAT AND SUSPENDED CHEMICAL PARTICLES
FROM GASES RESULTING FROM THE COMBUSTION OF A PULP
RESIDUAL LIQUOR AND APPARATUS THEREFOR
Filed Jan. 10, 1946
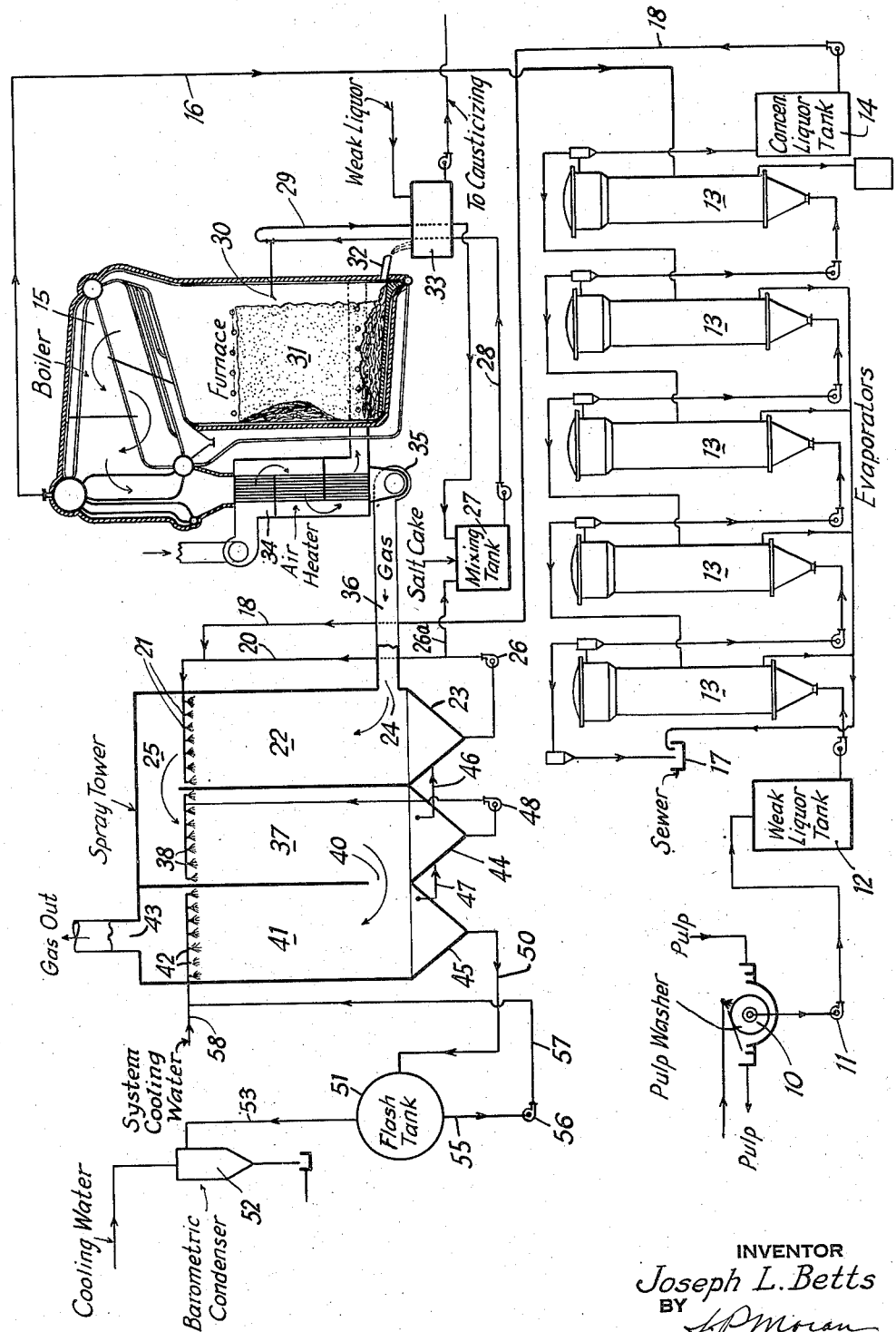
INVENTOR
Joseph L. Betts
BY
ATTORNEY Patented Oct. 10, 1950

2,524,753

UNITED STATES PATENT OFFICE 2,524,753

METHOD OF RECOVERING HEAT AND SUSPENDED CHEMICAL PARTICLES FROM GASES RESULTING FROM THE COMBUSTION OF A PULP RESIDUAL LIQUOR AND APPARATUS THEREFOR

Joseph L. Betts, Mobile, Ala.

Application January 10, 1946, Serial No. 640,359

8 Claims. (Cl. 23—48)

The present invention relates to a method and apparatus adapted for the recovery of heat from flue gases, and more particularly to the recovery of low temperature potential heat in flue gases leaving the furnace of a chemical recovery unit.

In chemical recovery processes a residual liquor containing inorganic chemicals and combustible organic matter, such as, for example, the "black liquor" in the sulphate process of manufacturing paper pulp, is burned in a furnace to recover the inorganic chemicals while the heat produced is absorbed in an associated heat exchange apparatus. The heat absorption surface installed in the unit is customarily limited by economic factors to a recovery of the relatively high temperature potential heat in the combustion gases as generated in the recovery furnace. As a result, the temperature of the flue gases leaving the heat exchange surfaces of the usual sulphate process chemical and heat recovery unit may be sufficiently high to carry a substantial amount of low temperature potential heat.

Since large quantities of steam are required in the plant processes, the heat exchange apparatus used in conjunction with the chemical recovery system mainly consists of a steam generator. In addition an air heater is customarily included in the apparatus to supply hot air to the recovery furnace to assist in the combustion of the liquor. The amount of heat to be absorbed in the heat exchange apparatus, and thus the temperature of flue gases leaving, is determined in advance of installation by an economic balance between the capital cost of the steam generating equipment against the amount of steam usable in the plant processes and/or for the generation of electric power, and the operating cost of steam generation. Likewise, the size, and hence the capital cost of the air heater is dictated by the quantity and temperature of the air required for the combustion of the residual liquor. The size of the air heater is further limited to avoid any reduction in flue gas temperature sufficient to permit the formation of acids by condensation of moisture in the gases and thus cause damage to the metallic parts of the air heater.

The economic conditions applicable to any particular plant installation may, of course, differ from those of other plants, but the usual installation of steam generating and air heating apparatus is designed to result in a flue gas temperature leaving such apparatus of the order of 400 to 600 F. The flue gases normally have a high moisture content of the order of 15% of the total gas weight and contain an appreciable amount of entrained solid matter which may include a substantial percentage of sodium base chemicals, such as sodium sulphate, the recovery of which is always desirable, not only in the elimination of a dust nuisance, but also economically in reclaiming usable chemicals for the digesting process.

When the flue gases leaving the steam generating and air heating apparatus are subsequently passed through a spray tower in direct contact with residual liquor sprays for the concentration of that liquor by the evaporation of moisture therefrom, the gases are cooled and discharge to the atmosphere in a heavily moisture laden condition approaching saturation. With the customary spray tower, the vapor content of the gases discharged therefrom may amount to 21% of the total gas weight, so that in addition to the dry stack loss there is an appreciable heat loss, due to the vapor content, which may be as much as 85% of the total stack loss. This loss from the stack occurs at a gas temperature of the order of 250 F., which is at too low a temperature to be economically recovered in the boiler heat cycle. Such low temperature potential heat is however of considerable value and importance in process plants, such as a pulp and paper plant, where a considerable quantity of warm wash water is used in the process.

It is thus the main object of the present invention to provide a method of and apparatus for recovering low temperature potential heat from gases having a high vapor content and transferring such recovered heat to a fluid medium for useful work. A further and specific object is to provide a method of and apparatus for recovering low temperature potential heat from the flue gases produced by the burning of a residual liquor in a chemical recovery process. A further specific object is to provide a method and apparatus of the type described characterized by its ability to reduce the temperature of the flue gases discharged from a chemical recovery unit by direct contact with a cooling liquid spray and subsequently subjecting the liquid heated by contact with those gases to a heat exchange process for the recovery of heat therefrom by flash evaporation of the flue gas cooling liquid and condensation of the evaporated vapor. A further specific object is to provide a method and apparatus of the type described in which the evaporatively cooled liquid is returned to the sprays for reuse in the flue gas cooling and heat recovery process and any solid matter reclaimed from the flue gases, by the effect of the sprays, is returned to the residual liquor for subsequent treatment in the chemical recovery furnace.

The various features of novelty which characterize my invention are pointed out with particularity in the claims annexed to and forming a part of this specification. For a better understanding of the invention, its operating advantages and specific objects attained by its use, reference should be had to the accompanying drawing and descriptive matter in which I have illustrated and described a preferred embodiment of my invention.

The drawing consists of a flow diagram illustrating the present invention as incorporated in a cyclic heat and chemical recovery system for the residual liquor from a sulphate pulp process.

In such a manufacturing process wood pulp from the digester blow pit (not shown) is delivered to one or more pulp washers 10 wherein the pulp is washed to remove organics, lignin and chemicals reusable in subsequent production. From the washers 10 the pulp is further processed in the manufacture of paper while the residual liquor is drawn from the washer by a pump 11 and delivered to a weak liquor storage tank 12. The weak liquor is pumped successively through multiple effect evaporator units 13 which reduce the moisture content of the liquor which is thereafter delivered to a concentrated liquor storage tank 14. As shown, the evaporator units 13 receive saturated steam from a boiler 15 through a connecting main 16 and after use, the steam condensate and the moisture evaporated from the liquor is discharged to the sewer 17 or otherwise disposed of.

The concentrated liquor is pumped from the tank 14 through the conduit 18 to a connection with a recirculating liquor pipe 20 and thence to multiple spray nozzles 21 positioned in the upper portion of a spray tower 22. The tower 22 is arranged with an inverted conical bottom which serves as a reservoir 23 for the collection of the liquor sprayed from the nozzles 21. The tower is provided with a gas inlet 24 in one side in the lower portion thereof adjacent the upper side of the reservoir 23 and it is also provided with a gas outlet 25 near the top. Flue gases from the boiler 15 and associated equipment as hereinafter described enter the tower 22 through the inlet 24, pass upwardly, therethrough countercurrent to and in direct contact with the downwardly sprayed evaporator concentrated residual liquor, leaving the tower by the outlet 25. In passing through the tower the flue gases will evaporate some of the moisture in the spray liquor, thereby cooling the gases and further concentrating the liquor accumulated in the reservoir 23. A pump 26 withdraws liquor from the reservoir 23 and delivers a predetermined amount thereof through a pipe 26a to a mixing tank 27 while the remainder of the liquor is forced through the pipe 20 to combine with the liquor delivered through the conduit 18 in serving the spray nozzles 21.

The liquor delivered to the tank 27 is mixed with a predetermined amount of salt cake makeup and pumped through a feed pipe 28 to an oscillating liquor spray nozzle 30 which is constructed and arranged to discharge a relatively coarse spray substantially horizontally across the furnace 31 in intimate contact with the ascending gas stream therein and to deposit the sprayed liquor upon the remaining furnace walls. To assure an uninterrupted flow of liquor through the pipe 28 and to the spray nozzle 30, the pipe 28 is provided with an extension 29 so that an excess of liquor above the requirements of the spray nozzle may be pumped into the pipe 28 with the excess returned to the mixing tank 27. A continuous flow of liquor through the line 28 and extension 29 will tend to avoid plugging of the feed pipe and consequent interruptions in furnace operations.

The spray nozzle 30 is operated so that the sprayed liquor therefrom is successively deposited in thin sheets upon a predetermined area of the furnace side walls and the wall opposite to the spray nozzle. Combustion air is regulably supplied to the furnace through several series of air inlet ports located at different levels in the furnace side and rear walls. As the liquor spray builds up on the furnace walls it is dried by the heat of the furnace leaving a porous mass or char which breaks off in chunks from the effect of gravity thereon. The char falls to the bed on the furnace hearth where it burns until the combustibles therein are consumed. The heat evolved in the combustion of the char converts the residual inorganic constituents to a molten smelt, which is reduced during its passage through the bed and flows through a furnace tap 32 into a dissolving tank 33 where the smelt is combined with a weak liquor and delivered to the causticizing plant (not shown) to be prepared for reuse in the pulp digesters.

A major portion of the heat in the gaseous products of combustion from the furnace is absorbed in the boiler section 15 of the recovery unit with the gases thereafter passing through a tubular air heater 34 and thence through an induced draft fan 35 and a duct 36 to the inlet 24 of the spray tower 22. Preheated air is highly desirable in the described combustion process, but the quantity of air that can be effectively used is limited, as well as its temperature, by the quantity of liquor consumed. Thus the amount of heat extracted from the flue gases by heat transfer to the combustion air is usually comparatively small. It is also desirable to maintain the temperature of the flue gases leaving the air heater at all ratings, safely above the dew point of those gases, so as to avoid any condensation of moisture from the flue gases in the air heater tubes and the corrosive effect of acids so formed on the metallic parts.

The flue gases passing through the boiler 15 and the air heater 34 thus release their high temperature potential heat by transfer to those heat absorptive surfaces and will ordinarily enter the spray tower 22 at a temperature of 400 to 600 F. These gases carry in suspension particles of solid matter as carry-over from the furnace 31 of which a large percentage is likely to consist of particles of sodium sulphate or other sodium base chemicals. The action of the liquor spray in the tower 22 not only will reduce the temperature of the gases passing therethrough and increase the concentration of the residual liquor by the evaporation of moisture but also will remove some of the suspended solid matter in the gas by reason of the mechanical washing action of the sprays and the changes in gas velocity and direction of gas flow in passing through the tower.

As shown in the flow diagram, the gases leave the tower 22 by the outlet 25 which also serves as an inlet to a second spray tower 37. A series of spray nozzles 38 are positioned in the upper portion of the tower 37 so that the direction of the spray discharge is downward parallel to the direction of gas flow. The spray discharge aids in the separation and collection of any black liquor droplets carried in suspension by the gases leaving the tower 22. Thereafter the gases leave the lower portion of the tower 37 by an opening 40 which also serves as an inlet to a third spray tower 41. The flow of gases through the tower 41 is upward, countercurrent to the spray from a group of spray nozzles 42 which are positioned in the upper portion of the tower. After leaving the tower 41 through an outlet 43 the gases are discharged to the atmosphere through a stack (not shown).

The towers 22, 37 and 41 are advantageously designed and the draft apparatus operated to secure a gas velocity in operation which will minimize the entrainment of liquor from one chamber to the following chamber and facilitate the removal of entrained solid particles of chemical in the gases. For these reasons, I have found that the gas velocity through the towers should not exceed eight feet per second.

The lower portion of the towers 37 and 41 are similar in construction to that of tower 22, in that each is shaped as an inverted cone and forms a reservoir for the accumulation of liquid from the sprays. The reservoir 45 in the bottom of tower 41 is connected by an overflow pipe 47 with the reservoir 44 of tower 37 and in a like manner, the reservoir 44 of tower 37 is connected by an overflow pipe 46 with the reservoir 23 of tower 22. Thus black liquor carryover collected in the towers 37 and 41 will be returned to the reservoir 23.

The spray nozzles 38 receive liquid from a pump 48 which is connected with the bottom of the reservoir 44, thus the liquid is recirculated for reuse in the sprays while any excess thereof flows through the pipe 46 to the reservoir 23, mingling with the liquor therein.

System cooling water is supplied at starting to the spray nozzles 42 through the make-up pipe 58. In normal operation the liquid in reservoir 45 is drawn through a connecting pipe 50 to a vacuum flash tank 51 which is maintained under a sub-atmospheric pressure by a barometric condenser 52. The vapor evaporated from the liquid by reason of the vacuum in the flash tank is discharged through a connecting pipe 53 to the barometric condenser 52 where it is condensed by direct contact with cooling water, thus yielding warm water free from contamination by the solids and black liquor collected in the towers 37 and 41. The heat extracted from the liquid in the tank 51 by the evaporation of a portion of the moisture therein not only cools that liquid, but in addition is recovered by heat transfer to the cooling water in the barometric condenser 52. The warm water from the condenser 52 is advantageously delivered to a point of utilization in the pulp mill.

With the evaporation of a portion of the water in the liquid delivered to the tank 51, the remaining evaporatively cooled liquid is drawn from the tank 51 through the pipe 55 by a pump 56 and delivered to the spray nozzles 42 through a pipe 57 for reuse in the spray tower 41. Since the amount of water evaporated in the tank 51 will normally be greater than that condensed in the tower 41, it is desirable to add a supply of make-up water to the cycle through the pipe 58. The amount of make-up water added is advantageously regulated to maintain the desired cooling effect of the sprays in tower 41 and to create a surplus of liquid in the reservoir 45. Such a surplus of liquid, with the suspended solids precipitated by the sprays will pass through the connection 47 to the reservoir 44 and eventually through the connection 46 to the reservoir 23 to mingle with the liquor. Proper regulation of the amount of make-up water added at 58 will permit the control of the density of liquid delivered to the reservoir 23. Suitable valves to regulate the liquor and water flow as described are provided in the various pipes and conduits.

In cooling the flue gases by the liquid sprays in the towers 22, 37 and 41 and with the consequent reduction in gas temperature, some of the moisture in those gases will be condensed and in condensing will precipitate the particles of solid matter suspended in the moisture of the gases. Thus both moisture and solid matter will be removed from the gases and be added to the liquid in the reservoirs 44 and 45. Such removal of moisture and suspended solids from the flue gases will be particularly effective in the tower 41 due to the low temperature of the gases passing therethrough.

Although the solid matter collected in the cooling liquid eventually passes with the surplus liquid delivered through the pipes 47 and 46 to join the residual liquor in the reservoir 23, the amount of solids so collected may be sufficient under certain operating conditions to justify the installation of a filter, or the like, in the pipe 57 to separate the liquid and the solids. In such circumstances the solids may be delivered directly to the reservoir 23 or to the mixing tank 27 while the cooling liquid is reused in the spray tower 41 as heretofore described.

For example, in one heat balance on the operation of the low temperature potential heat recovery system described, 75,000 pounds per hour of concentrated liquor containing 50% solids pass through the conduit 18 and the gases passing through the duct 36 contain approximately 46,200 pounds of moisture and are at a temperature of approximately 500° F. The gases in passing through the tower 22 will evaporate approximately 22,600 pounds of moisture per hour from the liquor sprays so that the liquor will be further concentrated to a solid content of approximately 55% while the gas temperature entering the tower 37 will be cooled to approximately 250° F. In passing through the towers 37 and 41 the gases are cooled by the liquid sprays to a temperature of approximately 120° F. upon leaving the outlet 43. With a reduction in gas temperature of this magnitude approximately 48,000 pounds per hour of the moisture originally contained in the combustion gases entering the tower 22 plus the moisture evaporated in tower 22 from the liquor sprays, will be condensed in towers 37 and 41. Of the liquid condensed by the reduction in temperature, approximately 15,800 pounds per hour will pass through the pipes 46 and 47 to the reservoir 23 and approximately 58,200 pounds per hour of vapor at a temperature of about 108° F. will be delivered to the condenser 52. Thus the low temperature potential heat reclaimed by the present invention will in the above example amount to the heat equivalent of approximately 400 gallons of fuel oil per hour.

I claim:

1. The process of continuously recovering low temperature potential heat from the gaseous products of combustion resulting from the burning of a pulp residual liquor which comprises passing said combustion gases through at least one gas cooling zone in direct contact with a sprayed liquid cooling medium, collecting the heated cooling medium with the moisture condensed from said gas and subjecting it to the evaporative cooling effect of subatmospheric pressure, condensing the vapor resulting from the subatmospheric evaporation of said heated cooling medium by heat exchange with a cooling water, and returning the cooled residue of said liquid cooling medium to the gas cooling zone for reuse as a cooling spray and withdrawing the cooling water heated in condensing said vapor.

2. The process of continuously recovering low temperature potential heat from the gaseous products of combustion resulting from the burning of a pulp residual liquor containing inorganic chemicals and combustible matter which comprises passing said combustion gases through a cooling zone in direct contact with a liquor spray to concentrate said liquor and to cool said gases by the evaporation of moisture from said liquor, passing the moisture laden gases through a second cooling zone in direct contact with a liquid spray to reduce the gas temperature below its dew point and condense moisture in the gases, passing said liquid and condensate to a subatmospheric pressure zone for the evaporation of a portion of said liquid and condensate, passing the evaporated moisture from said subatmospheric pressure zone to a condensing zone for the recovery of heat therefrom, and passing the residue of said liquid and condensate from said subatmospheric pressure zone to said second cooling zone for reuse in the sprays in said second cooling zone.

3. The method of recovering heat and suspended chemical particles from the gases resulting from the combustion of a pulp residual liquor which comprises simultaneously cooling the gases of combustion and concentrating said liquor prior to its combustion by passing said gases through an evaporative cooling zone in direct contact with a spray of said liquor, passing the moisture laden gases from said evaporative cooling zone through at least one additional gas cooling zone in direct contact with a spray of cooling medium and collecting solid materials suspended in said gases by the condensation of water vapor from said gases, passing a portion of said collected solid material in suspension with said medium to said evaporative cooling zone for mixing with said concentrated liquor, and passing the remainder of said cooling medium and condensate to a zone of subatmospheric pressure for cooling by the evaporation of moisture therefrom, transferring the heat evolved by said evaporative cooling to a heat exchange liquid, and returning the residue of said cooled medium with its suspended solid materials to the gas cooling zone.

4. The method of recovering heat and suspended chemical particles from the gases resulting from the burning of a pulp residual liquor in a combustion zone which comprises simultaneously cooling the gases of combustion and concentrating residual pulp liquor by passing said gases through an evaporative cooling zone in direct contact with a spray of said liquor, passing the concentrated liquor from said evaporative cooling zone to the combustion zone, cooling said gases by passing the gases from said evaporative cooling zone through at least one additional zone in direct contact with a spray of cooling medium and collecting solid materials suspended in said gases by the condensation of water vapor in said gases, passing a portion of said condensate and collected solid materials with said cooling medium to said evaporative cooling zone for inclusion with said concentrated liquor, passing the remainder of said cooling medium and condensate to a zone of subatmospheric pressure for cooling by the evaporation of moisture therefrom, transmitting the heat evolved by said evaporative cooling to a heat exchange liquid in a condensing zone, and returning the residue of said cooled medium with its suspended solid materials to the gas cooling zone.

5. The process of recovering chemicals and heat from pulp residual liquor containing inorganic chemicals and combustible organic matter which comprises burning the combustible organic matter in said liquor in a combustion zone; passing the gases of combustion produced in said combustion zone through a high potential heat absorption zone for the generation of steam and cooling of said gases; passing said cooled gases through an air heating zone for the further cooling of said gases and preheating air for combustion of said liquor; passing said gases through an evaporative cooling zone in direct contact countercurrent relationship with a spray of said residual liquor, the gases being cooled by the evaporation of moisture from said residual liquor, delivering the liquor concentrated by the evaporation of moisture therefrom to said combustion zone; passing said gases from said evaporative cooling zone through at least one additional zone in direct contact countercurrent flow relationship with a spray of cooling liquid, said liquid spray condensing water vapor in said gases with droplets of condensed vapor forming about and precipitating particles of solid matter suspended in said gases; passing the heated cooling liquid with contained condensate and precipitated solids to a zone of subatmospheric pressure for evaporative cooling with the heat evolved in such evaporation transmitted to a separate liquid heat transfer medium, and passing any liquid in excess of gas cooling requirements with its contained condensate and precipitated solids from said spraying zone to said evaporative cooling zone and mixing the same with said concentrated pulp residual liquor.

6. The process of recovering chemicals and heat from pulp residual liquor containing inorganic chemicals and combustible matter which comprises burning said liquor in a combustion zone; passing the gases of combustion produced in said combustion zone through a high potential heat absorption zone for the generation of steam and to cool said gases; passing said gases through an evaporative cooling zone in direct contact with a spray of said residual liquor, the gases being cooled by the evaporation of moisture from said residual liquor and the concentrated liquor being delivered to said combustion zone; passing said gases from said evaporative cooling zone through at least one additional gas cooling zone in direct contact flow relationship with a spray of cooling liquid, said liquid spray condensing at least a portion of the water vapor in said gases by lowering the temperature thereof below its dew point with droplets of condensate forming about and precipitating particles of solid matter suspended in said gases; passing the heated cooling liquid with contained condensate and precipitated solids to a zone of subatmospheric pressure for evaporative cooling with the heat evolved in such evaporation transmitted to a separate liquid heat transfer medium, returning the residue of said cooled cooling liquid with its suspended solid materials to the gas cooling zone, adding make-up cooling liquid to the cooling liquid spray in said gas cooling zone, and passing any liquid in excess of gas cooling requirements in said gas cooling zone with its contained condensate and precipitated solids from said gas cooling zone to said evaporative zone for inclusion with said concentrated pulp residual liquor.

7. Apparatus for recovering low temperature potential heat from the gases produced by the combustion of a residual liquor which comprises a liquor concentrating tower and at least one heat exchange tower arranged for a serial flow of said combustion gases therethrough, a plurality of downwardly opening spray nozzles arranged in the upper portion of each of said towers, a reservoir at the bottom of each tower, a liquor supply system connected with the nozzles in said liquor concentrating tower, a pump and pipe system connecting said liquor concentrating tower reservoir and nozzles and arranged for recirculation of liquor concentrated in said tower, a cooling liquid supply system connected with the spray nozzles in said heat exchange tower, means for the evaporative cooling of the liquid heated in said heat exchange tower by heat exchange with a separate cooling medium including a vacuum flash tank receiving liquid from the reservoir of said heat exchange tower and a barometric condenser, a conduit connection arranged to return the unevaporated evaporatively cooled cooling liquid from said flash tank to the nozzles of said heat recovery tower for reuse as a cooling liquid, and an overflow connection between said reservoirs for supplying heated cooling liquid to said liquor concentrating tower.

8. The combination of a furnace for the incineration of a residual liquor therein, a vapor generator for absorbing high temperature potential heat from the combustion gases produced in said furnace, a liquor spray tower arranged to receive flue gases from said vapor generator, a liquid spray tower arranged for a flow of flue gases therethrough from said liquor tower, a reservoir for each of said towers, spray means in the upper portion of said liquor tower arranged to project a plurality of liquor sprays into contact with the flue gases passing through said tower to concentrate said liquor prior to its incineration, spray means in the upper portion of said liquid spray tower arranged to project a plurality of cooling liquid sprays into the flue gases passing through said tower, a flash evaporating tank arranged to receive a flow of heated cooling liquid from the reservoir of said liquid spray tower, a barometric condenser arranged to receive evaporated vapor from said flash tank for heat exchange with a separate cooling medium, a conduit connection for returning unevaporated evaporately cooled residue of said liquid to the spray means of said liquid spray tower for reuse as a cooling medium, a make-up liquid connection to the liquid spray tower, and an overflow connection for the flow of heated cooling liquid with condensed moisture and solids precipitated from said combustion gases to the residual liquor reservoir in predetermined proportion to the flow of make-up liquid to said liquid spray tower.

JOSEPH L. BETTS.

REFERENCES CITED

The following references are of record in the file of this patent:

UNITED STATES PATENTS

| Number | Name | Date |
| --- | --- | --- |
| 2,185,095 | Smith, et al. | Dec. 26, 1939 |
| 2,318,522 | Powell | May 4, 1943 |

OTHER REFERENCES

Walker et al., "Principles of Chemical Engineering," 2nd ed., pp. 463; 464, published by McGraw-Hill Co., N. Y. 1927.

Perry, "Chemical Engineer's Handbook," 2nd edition, pp. 1793 and 1794. (1941), pub. by McGraw-Hill Co., N. Y.